(12) United States Patent
Kyllingstad

(10) Patent No.: US 8,412,472 B2
(45) Date of Patent: Apr. 2, 2013

(54) METHOD FOR DETECTION OF A FLUID LEAK RELATED TO A PISTON MACHINE

(75) Inventor: Age Kyllingstad, Algard (NO)

(73) Assignee: National Oilwell Norway AS, Stavanger (NO)

( * ) Notice: Subject to any disclaimer, the term of this patent is extended or adjusted under 35 U.S.C. 154(b) by 388 days.

(21) Appl. No.: 12/674,381

(22) PCT Filed: Jul. 25, 2008

(86) PCT No.: PCT/NO2008/000276
§ 371 (c)(1),
(2), (4) Date: Nov. 12, 2010

(87) PCT Pub. No.: WO2009/025558
PCT Pub. Date: Feb. 26, 2009

(65) Prior Publication Data
US 2011/0046902 A1    Feb. 24, 2011

(30) Foreign Application Priority Data
Aug. 21, 2007  (NO) .................................. 20074261

(51) Int. Cl.
*G01F 17/00* (2006.01)
(52) U.S. Cl. .......................................... 702/55; 700/90
(58) Field of Classification Search .................... 702/55, 702/177, 179, 182–185; 700/90
See application file for complete search history.

(56) References Cited

U.S. PATENT DOCUMENTS

| | | | |
|---|---|---|---|
| 5,471,400 A | 11/1995 | Smalley et al. | |
| 6,882,960 B2 * | 4/2005 | Miller | 702/182 |
| 2004/0167738 A1 | 8/2004 | Miller | |

FOREIGN PATENT DOCUMENTS

| | | |
|---|---|---|
| DE | 10355250 A1 | 6/2005 |
| EP | 0189021 A2 | 7/1986 |
| WO | 03087754 A1 | 10/2003 |
| WO | 2006112721 A1 | 10/2006 |

OTHER PUBLICATIONS

PCT/NO2008/000276 International Search Report, Dec. 8, 2008.

* cited by examiner

*Primary Examiner* — Edward Raymond
(74) *Attorney, Agent, or Firm* — Conley Rose, P.C.

(57) ABSTRACT

A method for detection of a fluid leak related to at least one piston machine (1), where the method includes: —attaching a pressure sensor (18, 24) to at least a pressure side of the at least one piston machine (1); —measuring the pressure on the pressure side of the at least one piston machine (1); —attaching a transmitter (28) to the at least one piston machine (1), said transmitter (28) rendering a signal for calculating the rotational speed of the at least one piston machine (1); —calculating the speed of the at least one piston machine (1); —calculating the sum of nominal flow rates from all piston machines (1); —calculating a flow rate compensation factor; —calculating a normalized pressure (42) to be equal to the discharge pressure multiplied by the said compensation factor for the flow rate; and —monitoring the normalized pressure (42) to detect a leakage.

21 Claims, 2 Drawing Sheets

METHOD FOR DETECTION OF A FLUID LEAK RELATED TO A PISTON MACHINE

CROSS-REFERENCE TO RELATED APPLICATIONS

Figure 1:
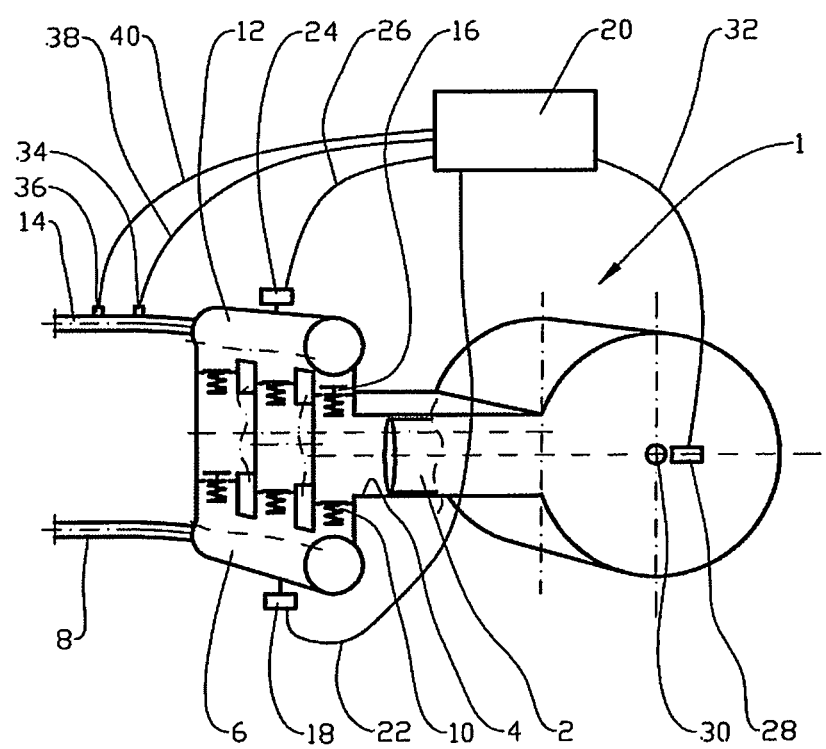

The present application claims the benefit of priority to PCT/NO2008/000276 filed Jul. 25, 2008, which claims the benefit of Norwegian Application No. 20074261 filed Aug. 21, 2007, both of which are incorporated herein by reference in their entirety for all purposes.

STATEMENT REGARDING FEDERALLY SPONSORED RESEARCH OR DEVELOPMENT

Not applicable.

This invention concerns detection of a fluid leak in relation to a piston machine. More specifically, the method for detection of a fluid leak related to at least one piston machine (1) includes:
- attaching a pressure sensor to at least a pressure side of the at least one piston machine;
- measuring the pressure on the pressure side of the at least one piston machine;
- attaching a sensor to the at least one piston machine, said sensor rendering a signal for calculating the rotational speed of the at least one piston machine;
- calculating the speed of the at least one piston machine;
- calculating the sum of nominal flow rates from all piston machines;
- calculating a flow rate compensation factor;
- calculating a normalized pressure to be equal to the discharge pressure multiplied by the said flow rate compensation factor; and
- monitoring the normalized pressure to detect a leakage.

Detection and localization of leaks related to piston machines is important for minimizing costs and down time related to valve and piston failures. A leak in one or more valves or pistons will cause a drop in the volumetric efficiency. If a pump is running at a constant speed, this reduction in efficiency also causes the actual flow rate and the mean discharge pressure to drop. However, a pressure drop can result also from a reduction in the total flow rate, external leaks, or reductions in the flow resistance. This resistance is affected by fluid temperature, viscosity and density.

Methods according to prior art for the detection of leaks related to a piston machine is often influenced by factors different from those related to the occurrence of a leak, and tends to give false alarms due to for instance changes in pressure and resistance in downstream machinery.

The object of the invention is to remedy or reduce at least one of the drawbacks of the prior art.

The object is achieved according to the invention by the features as disclosed in the following description and the subsequent patent claims.

A method according to the invention for detection of a fluid leak related to at least one piston machine includes:
- attaching a pressure sensor to at least a pressure side of the at least one piston machine;
- measuring the pressure on the pressure side of the at least one piston machine;
- attaching a sensor to the at least one piston machine, said sensor rendering a signal for calculating the rotational speed of the at least one piston machine;
- calculating the speed of the at least one piston machine;
- calculating the sum of nominal flow rates from all piston machines;
- calculating a flow rate compensation factor;
- calculating a normalized pressure to be equal to the discharge pressure multiplied by the said compensation factor for flow rate; and
- monitoring the normalized pressure to detect a leakage.

Although change in the unprocessed discharge pressure is a possible leak indicator, it is advantageous to calculate and monitor a normalized pressure. The normalized pressure is preferably compensated for changes in flow rate, fluid temperature and density. Especially the pump rate affects the pressure much as most pressure losses in a flow loop increases nearly as the flow rate squared.

The normalized pressure can be written as a product of compensation factors and the measured pressure $$p_n = C_q C_T C_d p \tag{E1a}$$

Or if the compensation for changes in fluid temperature and density are omitted $$p_n = C_q p \tag{E1b}$$

A possible choice for a flow rate compensation function is $$C_q = \left(\frac{q_0}{q}\right)^\beta \tag{E2}$$

q is the sum of nominal flow rates calculated from the speeds of all running pumps, $q_0$ is a chosen reference flow rate and $\beta$ is an exponent. An explicit expression for the nominal flow rate is $$q = \sum_i \frac{n_i V_i \Omega_i}{2\pi} \tag{E3}$$

here the $n_i$ denotes number of pistons of pump no i, $V_i$ is the stroke volume of each piston and $\Omega_i$ is the pump rotation speed. The value chosen for the reference flow rate is arbitrary, for instance the maximum flow rate from one pump.

Thus the flow rate compensation factor equals the quotient of the calculated sum of the nominal flow rates of the at least one piston machine divided by a chosen reference flow rate, the quotient raised to the power of a pressure exponent that is between 1.2 and 2.5.

The pressure exponent $\beta$ may either be set as a constant, more preferably to a value between 1.5 and 2, or it may be determined experimentally by measuring the average discharge pressures, $p_1$ and $p_2$ for two different flow rates, $q_1$ and $q_2$ and applying the formula $$\beta = \frac{\log(p_2/p_1)}{\log(q_2/q_1)} \tag{E4}$$

Assuming that a linear relation between pressure drop and temperature is a suitable choice for the temperature compensation, when measuring the temperature of the fluid, the temperature compensation factor is equal to the quotient of 1 divided by a difference of 1 minus a temperature sensitivity parameter multiplied by a difference between an actual fluid temperature and a reference temperature. The temperature sensitivity parameter is the quotient of a difference between two pressures divided by the product of a difference between two temperatures multiplied by one of the pressures, the two pressures and the related two temperatures being determined experimentally. Thus, the temperature compensation is written $$C_T = \frac{1}{1 - \gamma(T - T_0)} \quad (E5)$$

where $T_0$ is a chosen reference temperature, for instance 20° C. $\gamma$ is a temperature sensitivity parameter that can be determined experimentally. If no growing leaks are involved and the pressure is measured for two different fluid temperatures $T_1$ and $T_2$, and all other parameters being constant, then the temperature sensitivity factor can be found from $$\gamma = \frac{p_1 - p_2}{(T_2 - T_1)p_1} \quad (E6)$$

In cases where temperature is not measured continuously, the temperature compensation can be omitted, that is, $C_T$ can be set to unity.

As long as the flow trough the major flow loop restrictors is turbulent, the pressure drop is nearly proportional to the fluid density. When measuring the density of the fluid, the determination of a density compensation factor equals a quotient of a reference density and the actual density of the fluid. The density compensation factor is therefore $$C_d = \frac{\rho_0}{\rho} \quad (E7)$$

where $\rho$ is the actual density and $\rho_0$ is a chosen reference density, for instance the density of water. In cases where density is rarely changed or is not measured continuously, the density compensation can be omitted, that is, $C_d$ can be set to unity.

The main advantage of using this normalised pressure is that, in contrast to the pressure itself, it is nearly independent of changes in the mentioned variables.

There are, however, other varying factors that also affect the pressure but are more difficult to model. One example is the torque induced pressure drop across a down hole mud motor. Another example is mud pulse telemetry systems communicating through pressure pulses. To avoid false alarms triggered by such variations, it is necessary to smoothen or low pass filter the normalized pressure. The cut-off frequency of such a low pass filter must be sufficiently low to dampen non-compensated variations effectively, but not so low that the changes from real leaks are severely delayed.

An alarm may be activated when the low pass filtered normalized pressure drops below an alarm limit.

Another challenge are long transient times, which means that it takes some time before a change in flow conditions result in a steady pressure. When the total flow rate is changed as a result of a pump speed adjustment, for instance, the new equilibrium pressure is not established instantaneously, but typically a few tens of seconds after the change of flow rate took place. This is due to the fluid compressibility and the substantial fluid volume in a flow loop. Changes in fluid temperature or density will have even longer transient times, typically equal to a circulation round trip time, which equals the total circulation volume divided by the flow rate.

One way to avoid or minimize the transient effects is to keep the normalised low pass filtered pressure constant and inhibit alarm setting for some time period after a change of flow conditions.

It is unpractical for an operator to keep continuous focus on the normalized pressure. It is therefore necessary to let a computer supervise the normalized pressure and set an alarm if the normalized pressure decreases below a certain alarm limit. Since both the mean normalized pressure and its natural fluctuations vary from one condition to another, alarm limit should not be absolutely fixed.

In a preferred embodiment the alarm limits are set automatically by the following procedure:

Ignoring the corresponding transient changes of the normalized pressure during and in a quarantine period after a substantial change of the nominal flow rate, keeping the low pass filtered value of the said pressure constant during said period. The necessary quarantine time can vary from typically a few seconds to a few minutes depending on conditions.

Monitoring the low pass filtered normalized pressure during a subsequent base estimation period after the end of the quarantine time. During base estimation period, lasting for typically a few minutes, the base value for the normalized pressure is determined.

Determining the alarm limit based on the normalized pressure measured during the base estimating period at the end of the base estimation period; The alarm limit is based on the average value and variations of the normalized pressure. The limits may either be relative, for instance that an alarm is set if the normalized pressure drops below 95% of its base value, they may be absolute, for instance if the first harmonic pressure amplitude deviates 1 bar from the base value, or they may be a more complicated function of both the average value and detected extremes of the normalised pressure.

Keeping the alarm limits constant after said period, when the piston machine is running at steady conditions, meaning that a leak alarm is set if the normalized pressure drops below the alarm limit.

A leak alarm is an indication of that there is a high probability that a growing leak is under development.

Determining the limit could include that the limit is taken as a function of at least the average, standard deviation or extreme values of the low pass filtered normalized pressure measured during said base estimation period.

According to the invention the normalized pressure is utilised to give an early warning that a leak is developing in the system as whole. The method is not capable of localizing the leak, that is, to indicate where the leak is developing.

Figure 2:
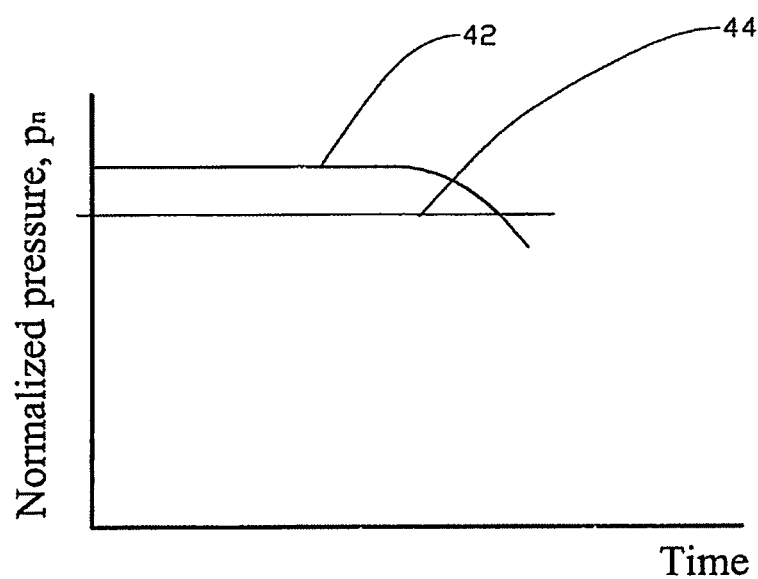

In the following there is described a non-limiting example of use of the method illustrated in the accompanying drawings, in which:

FIG. 1 schematically shows a pump with upstream and downstream pipe connections; and FIG. 2 shows an idealized graph illustrating the normalized pressure versus time.

On the drawings the reference numeral 1 denotes a so-called triplex pump, below termed pump, provided with three individually acting pistons 2 extending through their respective cylinders 4. Only the first piston 2 and corresponding cylinder 4 are shown. The cylinders 4 communicate with an inlet manifold 6 and an upstream pipe 8 through their respective inlet valves 10, and an outlet manifold 12 and a downstream pipe 14 through their respective outlet valves 16.

An inlet pressure sensor 18 is connected to the inlet manifold 6, communicating with a computer 20 via a cable 22, and an outlet pressure sensor 24 is connected to the outlet manifold 12, communicating with the computer 20 via a cable 26. A rotational angle transmitter 28 is arranged to measure the rotational angle of a crankshaft 30 of the pump 1, communicating with the computer 20 by means of a cable 32.

A temperature sensor 34 and a density meter 36 are connected to the downstream pipe 14 and communicate with the computer 20 through cables 38 and 40 respectively.

The sensors 18, 24, the transmitter 28, the sensor 34, the meter 36 and the computer 20 are of types that are known per se, and the computer 20 is programmed to carry out the calculations in question.

In the event of a leak in a not shown packing of the piston 2, the discharge through the outlet valve 16 during the pumping phase will be reduced by a quantity equal to the leakage flow past the piston 2.

As the flow rate is reduced, the pressure p measured by the outlet pressure sensor 28 will decrease. A normalized pressure 42 that is calculated as outlined in the general part of the description, will also decrease, se FIG. 2. When the normalised pressure 42 reaches a first limit 44, the first limit is automatically set as lined out in the general part of the description, the computer 24 sets an alarm.

The normalized pressure 42 may have undergone low pass filtering and/or being compensated for fluid temperature and/or fluid density.

The alarm set by the computer 20 may trigger a further investigation in order to localise the leak.

The invention claimed is:

1. A method for detection of a fluid leak related to at least one piston machine, the method comprising:
   attaching a pressure sensor to at least an outlet side of the at least one piston machine;
   measuring pressure on the outlet side of the at least one piston machine;
   attaching a transmitter to the at least one piston machine, said transmitter rendering a signal for calculating a rotational speed of the at least one piston machine;
   calculating the rotational speed of the at least one piston machine;
   calculating a sum of nominal flow rates from each of the at least one piston machine;
   calculating a flow rate compensation factor;
   calculating a normalized pressure to be equal to a discharge pressure at the outlet side multiplied by said flow rate compensation factor; and
   monitoring the normalized pressure to detect a leakage.

2. The method according to claim 1, further comprising:
   calculating a flow rate compensation factor that equals a quotient of the sum of nominal flow rates of the at least one piston machine divided by a chosen reference flow rate, the quotient raised to a power of a pressure exponent that is between 1.2 and 2.5.

3. The method according to claim 2, wherein the pressure exponent in the flow compensation factor is between 1.5 and 2.

4. The method according to claim 1, further comprising:
   low pass filtering the normalized pressure; and
   monitoring the normalized low pass filtered pressure to detect a leakage.

5. The method according to claim 2, further comprising:
   determining the pressure exponent in the flow compensation factor experimentally by measuring average discharge pressures at two different flow rates, where the pressure exponent is a quotient of a logarithm of a quotient of the two pressures divided by a logarithm of a quotient of the two flow rates.

6. The method according to claim 1, further comprising:
   measuring the temperature of fluid output from the piston machine;
   determining a temperature compensation factor as a quotient of 1 divided by a difference of 1 minus a temperature sensitivity parameter multiplied by a difference between an actual fluid temperature and a reference temperature, and where the temperature sensitivity parameter is a quotient of a difference between two pressures divided by a product of a difference between two temperatures multiplied by one of the two pressures, the two pressures and the corresponding two temperatures being determined experimentally;
   multiplying the normalized pressure by the temperature compensation factor;
   monitoring the temperature compensated normalized pressure to detect a leakage.

7. The method according to claim 1, further comprising:
   measuring density of the fluid output from the piston machine;
   determining a density compensation factor as a quotient of reference density and an actual density of the fluid;
   multiplying the normalized pressure by the density compensation factor; and
   monitoring the density compensated normalized pressure to detect a leakage.

8. The method according to claim 1, further comprising:
   activating an alarm when a low pass filtered version of the normalized pressure drops below an alarm limit.

9. The method according to claim 8, wherein the alarm limit is automatically set by the following procedure:
   ignoring transient changes of the normalized pressure during a quarantine period after a substantial change of the nominal flow rate;
   monitoring the low pass filtered version of the normalized pressure during a subsequent base estimation period after the end of the quarantine time and determining a base value for the normalized pressure;
   determining the alarm limit based on the normalized pressure measured during the base estimation period at the end of the base estimation period;
   keeping the alarm limit constant after the base estimation period, while the piston machine is running at steady conditions.

10. The method according to claim 9, further comprising:
    determining the alarm limit as a function of at least one of an average, standard deviation, and extreme values of a low pass filtered version of the normalized pressure measured during said base estimation period.

11. A system, comprising:
    one or more pumps, each of the pumps comprising:
      a piston;
      a crankshaft;
      an outlet manifold; and
      a transmitter arranged to measure a rotational angle of the crankshaft;
    a pressure sensor coupled to the output manifold to measure outlet pressure; and
    a computer coupled to the pumps, the computer configured to:
      receive outlet pressure measurements and crankshaft rotational angle measurements;

compute a sum of nominal flow rates of the pumps based on the crankshaft rotational angle measurements;
compute a flow rate compensation factor;
compute a normalized pressure for the pumps based on the outlet pressure measurements and the flow rate compensation factor; and
detect a leak in the pumps based on the normalized pressure.

12. The system of claim 11, further comprising: a temperature sensor disposed to measure temperature of fluid output from the pumps; wherein the computer is configured to compute the normalized pressure based on a temperature compensation factor; wherein the temperature compensation factor is based on temperature sensitivity of the fluid and fluid temperature measurements received from the temperature sensor.

13. The system of claim 11, further comprising a density meter disposed to measure density of fluid output from the pumps; wherein the computer is configured to compute the normalized pressure based on a density compensation factor; wherein the density compensation factor is based on a reference density value and fluid density measurements received from the density meter.

14. The system of claim 11, wherein the computer is configured to:
low pass filter the normalized pressure; and
detect a leak in the pumps based on the low pass filtered normalized pressure.

15. The system of claim 11, wherein the computer is configured to compute the flow rate compensation factor as a quotient of the sum of nominal flow rates of the pumps divided by a reference flow rate, the quotient raised to a power of a pressure exponent that is between 1.2 and 2.5.

16. The system of claim 11, wherein the computer is configured to:
activate an alarm based on the normalized pressure being less than an alarm limit value; and to determine the alarm limit value the computer is configured to:
identify a change in the nominal flow rate of the pumps;
initiate, based on the change, a quarantine period during which the computer disregards transient changes in the normalized pressure;
initiate, subsequent to the quarantine period, a base estimation period during which the computer measures the normalized pressure and determines a base value for the normalized pressure; and
determine the alarm limit value based on the normalized pressure measured during the base estimation period.

17. A device for detecting leaks in a piston machine, comprising:
a computer configured to:
receive output manifold pressure measurements and rotational angle measurements from one or more pumps;
compute a sum of nominal flow rates of the pumps based on the rotation angle measurements;
compute a flow rate compensation factor for the pumps;
compute a normalized pressure for the pumps based on the output manifold pressure measurements and the flow rate compensation factor;
low pass filter the normalized pressure; and
detect a leak in the pumps based on the low pass filtered normalized pressure.

18. The device of claim 17, wherein the computer is configured to:
compute a temperature compensation factor based on temperature sensitivity of the fluid and measured temperature of fluid output from the pumps; and
compute the normalized pressure based on the temperature compensation factor.

19. The device of claim 17, wherein the computer is configured to:
compute a density compensation factor based on a reference density value and measured density of fluid output from the pumps;
compute the normalized pressure based on the density compensation factor.

20. The device of claim 17, wherein the computer is configured to compute the flow rate compensation factor as a quotient of the sum of nominal flow rates of the pumps divided by a reference flow rate, the quotient raised to a power of a pressure exponent that is between 1.2 and 2.5.

21. The device of claim 17, wherein the computer is configured to:
identify a change in the nominal flow rate of the pumps;
initiate, based on the change, a quarantine period during which the computer disregards transient changes in the normalized pressure;
initiate, subsequent to the quarantine period, a base estimation period during which the computer measures the normalized pressure and determines a base value for the normalized pressure;
determine an alarm limit value based on the normalized pressure measured during the base estimation period; and
activate a leak detection alarm based on the normalized pressure being less than the alarm limit value.

* * * * *

UNITED STATES PATENT AND TRADEMARK OFFICE
CERTIFICATE OF CORRECTION

PATENT NO. : 8,412,472 B2  Page 1 of 1
APPLICATION NO. : 12/674381
DATED : April 2, 2013
INVENTOR(S) : Age Kyllingstad It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 653 days.

Signed and Sealed this

First Day of September, 2015

Michelle K. Lee
*Director of the United States Patent and Trademark Office*